United States Patent
Katoh (10) Patent No.: US 7,548,058 B2
(45) Date of Patent: Jun. 16, 2009

(54) ROTATIONAL ANGEL DETECTOR WITH ROTATIONAL-ANGLE CHANGE-AMOUNT CALCULATING UNIT CALCULATING AMOUNT OF CHANGE OF ABSOLUTE ROTATIONAL ANGLE

(75) Inventor: Toshi Katoh, Tokyo (JP)

(73) Assignee: Niles Co., Ltd. (JP)

( * ) Notice: Subject to any disclaimer, the term of this patent is extended or adjusted under 35 U.S.C. 154(b) by 255 days.

(21) Appl. No.: 11/730,206

(22) Filed: Mar. 30, 2007

(65) Prior Publication Data
US 2007/0229062 A1 Oct. 4, 2007

(30) Foreign Application Priority Data
Mar. 31, 2006 (JP) .............................. 2006-097517

(51) Int. Cl.
  G01B 7/30 (2006.01)
(52) U.S. Cl. .............................. 324/207.21; 324/207.25
(58) Field of Classification Search .............. 324/207.2, 324/207.21, 207.25, 173–174
See application file for complete search history.

(56) References Cited

U.S. PATENT DOCUMENTS 5,880,586 A * 3/1999 Dukart et al. ............. 324/207.2
6,507,188 B1 * 1/2003 Dilger et al. ........... 324/207.25
2006/0006861 A1 * 1/2006 Heinze et al. .......... 324/207.21
2007/0252590 A1 * 11/2007 Kondo .................... 324/207.25
2008/0094058 A1 * 4/2008 Kawashima et al. ... 324/207.25

FOREIGN PATENT DOCUMENTS

JP   2003-202224   7/2003

* cited by examiner

Primary Examiner—Jay M Patidar
(74) Attorney, Agent, or Firm—Rader Fishman & Grauer PLLC; Ronald P. Kananen (57) ABSTRACT

A small-sized rotational angle detector can output both the absolute rotational angle α including the frequency of the steering shaft and the relative rotational angle signal. The amount of change of the absolute rotational angle is calculated on a sampling-period basis. A transition interval is determined based on the sampling period and the amount of change of the absolute rotational angle. Based on the preset pulse pattern, A-phase, B-phase and Z-phase pulses transitioning at the transition intervals are generated. Assuming that the amount of change of the absolute rotational angle in the sampling period of 10 ms is 2°, 2.5 ms obtained by dividing the sampling period 10 ms by the range of change 4 converted based on a predetermined unit 0.5° of the absolute rotational angle region, is defined as a pulse transition interval. The pulses are outputted as a relative rotational angle signal. Unnecessity of large-diameter disk having slits enables reducing the size of the entire detector and enhancing the degree of shape freedom.

8 Claims, 8 Drawing Sheets

| TABLE VALUE | ABSOLUTE ANGLE | A PHASE | B PHASE | Z PHASE |
|---|---|---|---|---|
| 0 | 0.0~0.4 | H | L | H |
| 1 | 0.5~0.9 | H | H | H |
| 2 | 1.0~1.4 | L | H | H |
| (OMISSION) | | | | |
| 357 | 178.5~178.9 | H | H | L |
| 358 | 179.0~179.4 | L | H | L |
| 359 | 179.5~179.9 | L | L | L |
| 360 | 180.0~180.4 | H | L | L |
| 361 | 180.5~180.9 | H | H | L |
| 362 | 181.0~181.4 | L | H | L |
| (OMISSION) | | | | |
| 717 | 358.5~358.9 | H | H | H |
| 718 | 359.0~359.4 | L | H | H |
| 719 | 359.5~359.9 | L | L | H |

ROTATIONAL ANGEL DETECTOR WITH ROTATIONAL-ANGLE CHANGE-AMOUNT CALCULATING UNIT CALCULATING AMOUNT OF CHANGE OF ABSOLUTE ROTATIONAL ANGLE

CROSS-REFERENCE TO RELATED APPLICATION

This application is based on Japanese Patent Application No. 2006-097517 filed on Mar. 31, 2006, the disclosure of which is incorporated herein by reference.

BACKGROUND OF THE INVENTION

1. Field of the Invention

This invention relates to a rotational angle detector used for, for example, detecting a rotational angle of the steering wheel of a vehicle.

2. Description of the Related Art

The headlight control systems of a vehicle, which have been developed for practical use, detect a rotational angle of the steering wheel on the basis of a relative rotational angle signal sent from a relative rotational angle sensor to automatically control the change in the beam direction of the headlights in the right-left direction in accordance with the rotational angle thus detected.

The Electronic Stability Control Systems of a vehicle, which have been developed for practical use, detect a rotational angle of the steering wheel based on an absolute rotational angle signal from an absolute rotational angle sensor to prevent skidding based on the rotational angle thus detected and the like.

For developing a new-type vehicle equipped with both the headlight control system and the electronic stability control system, a conceivable procedure is the use of the two systems without any change from the viewpoint of the period of development.

In this case, it is necessary to equip a vehicle with a relative rotational angle sensor for the headlight control system and an absolute rotational angle sensor for the Electron Stability Control system. This results in an increase in the size of the sensor, leading to an increase in cost.

Accordingly, a desirable rotational angle detector has designed to obtain both the absolute rotational angle and the relative rotational angle.

Examples of such a rotational angle detector capable of detecting an absolute rotational angle and a relative rotational angle include the rotational angle detector disclosed in Japanese Examined Patent Publication H3-61886.

Figure 7:
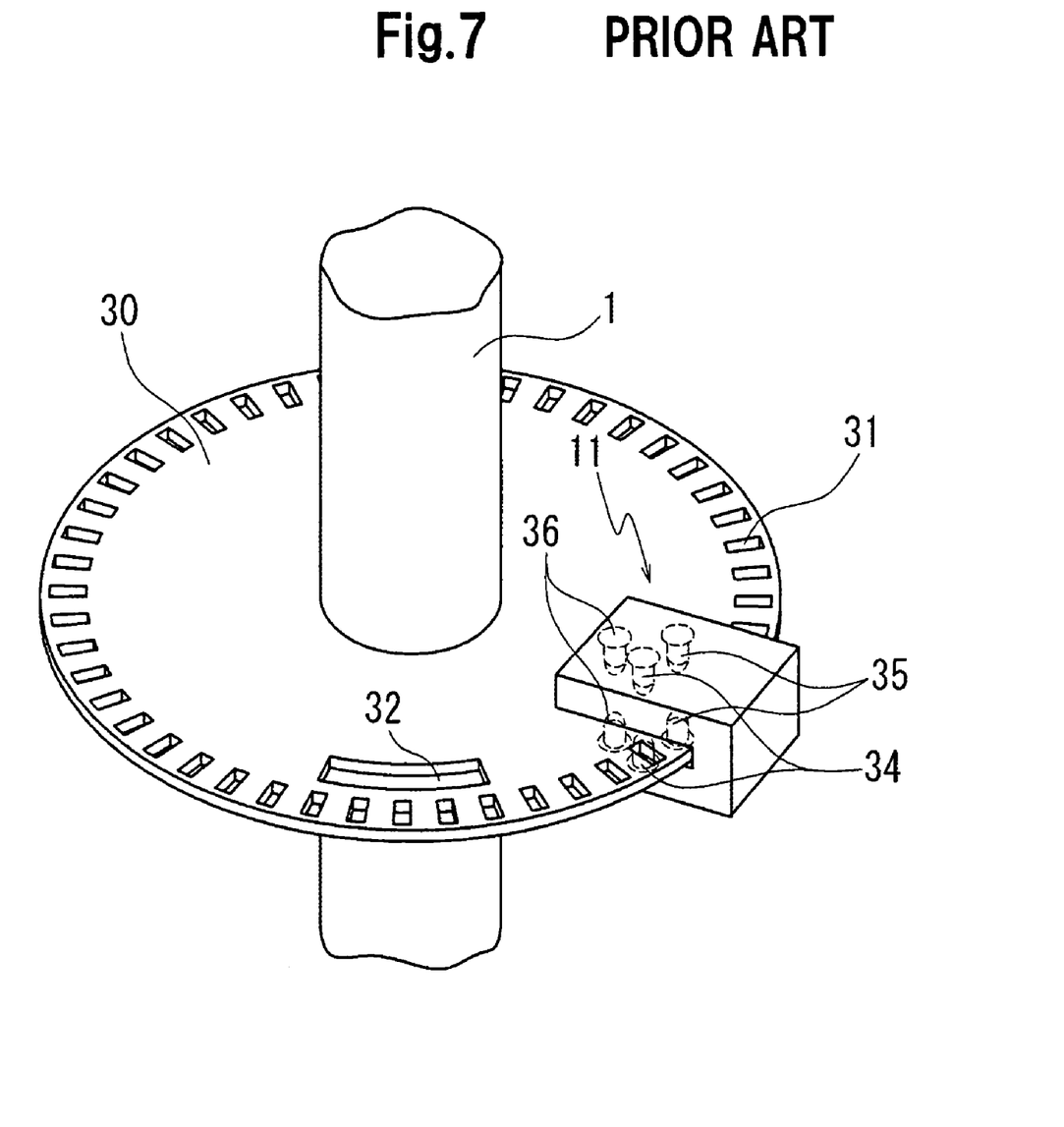
FIG. 7 is a diagram illustrating a conventional example.

As shown in FIG. 7, in this rotational angle detector, a disk 30 having first slits 31 provided at regular angular intervals along its peripheral edge is attached to a steering shaft 1, and first and second optical sensors 34, 35 each comprising a combination of a light-emitting diode and a phototransistor are placed in connection with the first slits 31, to provide an A-phase pulse and a B-phase pulse in accordance with the passage of the first slits in association with the rotation of the steering shaft 1.

The first and second optical sensors 34, 35 are arranged such that the phases of the A-phase and B-phase output pulses are separated from each other by one-quarter period.

In addition, a second slit 32 is provided in the disk 30 for detection of the neutral position. A third optical sensor 36 outputting a Z-phase pulse is disposed for detecting the second slit 32 when the steering shaft 1 is placed in the neutral position.

According to Japanese Examined Patent Publication H3-61886, the use of either an A-phase output pulse or a B-phase output pulse makes it possible to provide a rotation change from any selected position of starting the rotation and also to find the rotating direction from the order of change in the correlation between A phase and B phase. In short, a relative rotational angle is provided.

Figure 8:
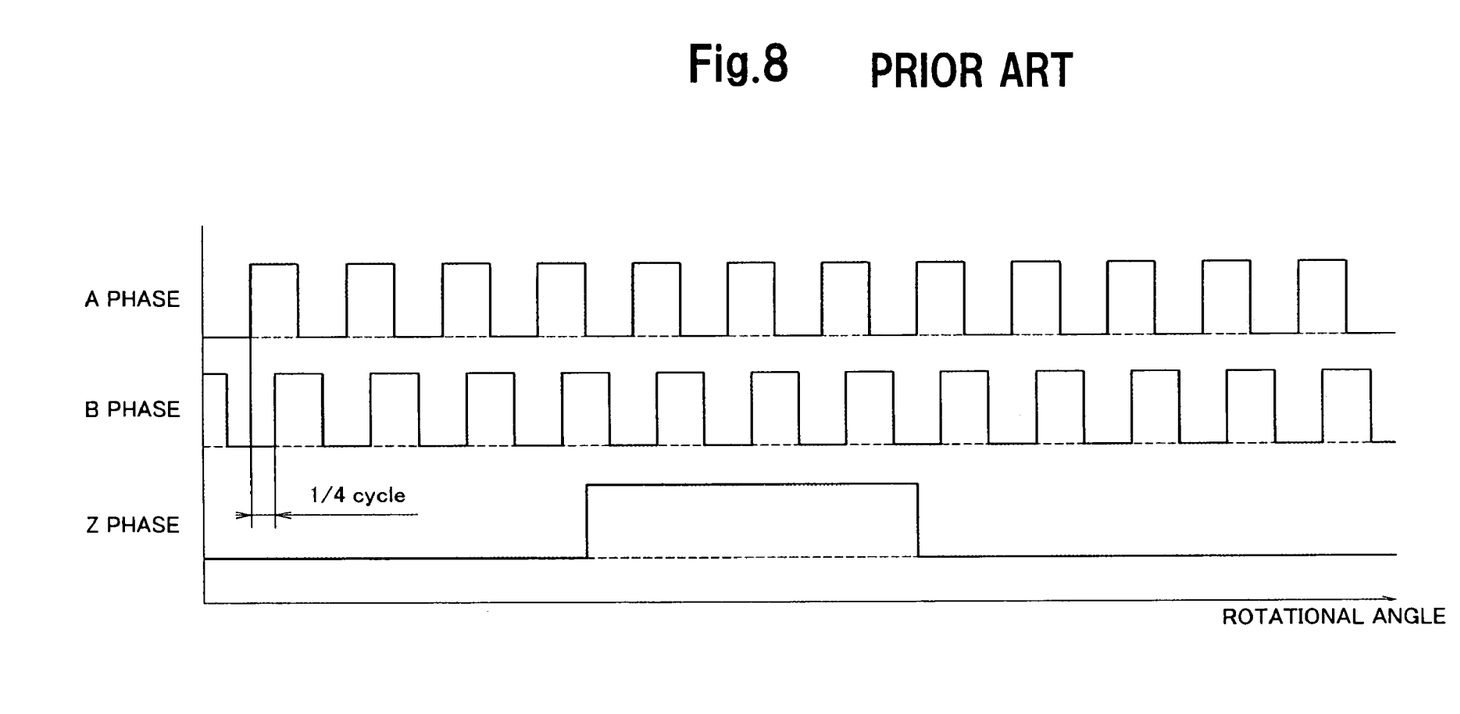
FIG. 8 is a chart showing the pulse pattern of a relative rotational angle signal.

FIG. 8 shows a pulse pattern of such a relative rotational angle signal.

Also, the number of rotations of the disk 30 can be found by counting the number of times that the third optical sensor 36 detects the second slit 32 from the Z phase. For this reason, based on this count value and a relative rotational angle obtained from A phase and B phase, it is possible to obtain the rotation angle as an absolute rotational angle from the neutral position even when the rotation goes through more than 360 degrees.

SUMMARY OF THE INVENTION

However, the above rotational angle detector has the problem of a low degree of design freedom in the size of the entire detector because of the increased size of the component which is attributable to the use of a disk 30 having the first and second slits 31, 32 provided along its peripheral edge.

In particular, an increase in the number of first slits is required for an increase in the resolution of the rotation angle to improve the detection accuracy, thus further increasing the size of the disk 30.

In this connection, a rotational angle detector having a small size and the capability of outputting the absolute rotational angle is disclosed in Japanese Unexamined Patent Publication 2003-202224, for example.

This rotational angle detector is provided with a rotational member rotating in synchronization with the steering shaft. An MR sensor is mounted on the rotational member for detecting a periodic angular position of the rotational member. A CPU uses a reference position stored in a non-volatile data storage unit to perform an operation on data from the MR sensor to calculate an absolute rotational angle including the number of turns of the steering shaft.

However, since the MR sensor outputs a sine wave, it is impossible to use the output as a relative rotational angle without any processing.

For this reason, when both an absolute rotational angle and a relative rotational angle are required, another relative rotational angle sensor is additionally necessary, thus requiring extra mounting space as well as an increase in cost, which runs counter to the trend toward a reduction in the entire detector.

Such size reduction is not only required common in the rotational angle detectors for the headlight control system and the Electronic Stability Control System of the vehicles, but also generally required common in the rotational angle detectors which are required to output both an absolute rotation angle and a relative rotation-angle signal.

In view of the above, there exists a need for a rotational angle detector which overcomes the above-mentioned problem in the related art. The present invention addresses this need in the related art as well as other needs, which will become apparent to those skilled in the art from this disclosure.

It is therefore an object of the present invention to provide a rotational angle detector which has a reduced size and is capable of outputting both an absolute rotational angle and a relative rotational angle signal without an increase in cost, in light of the conventional problems as described above.

To attain this object, the present invention provides a rotational angle detector equipped with an absolute rotational angle detecting unit for detecting an absolute rotational angle including a frequency of a measured rotational element to output the absolute rotational angle. This rotational angle detector comprises a rotational-angle change-amount calculating unit for calculating the amount of change of the absolute rotational angle from one sampling period to another; a transition-interval setting unit for setting a transition interval on the basis of the sampling period and the amount of change of the absolute rotational angle; and a pulse generating unit for generating pulses transitioning in order at the transition intervals in accordance with the change of the absolute rotational angle in the sampling period on the basis of a pulse pattern preset in correspondence with each predetermined-unit region of the absolute rotational angle, in which the pulses thus generated are outputted as a relative rotational-angle signal.

The rotational angle detector generates a pulse changing based on a predetermined pulse pattern at changing intervals in accordance with the amount of change of the absolute rotational angle in a sampling period, and outputs the generated pulse as a relative rotational-angle signal. Accordingly, the rotational angle detector is capable of outputting a relative rotational-angle signal as well as an absolute rotational angle without a large-diameter disk, thus reducing the size of the entire rotational angle detector and increasing the degree of shape flexibility.

In addition, the need to provide an extra apparatus outputting a relative rotational-angle signal in addition to the rotational angle detector outputting the absolute rotational angle is eliminated, thereby avoiding a considerable increase in cost caused by providing two apparatuses.

These and other objects, features, aspects and advantages of the present invention will be become apparent to those skilled in the art from the following detailed description, which, taken in conjunction with the annexed drawings, discloses a preferred embodiment of the present invention.

BRIEF EXPLANATION OF THE DRAWINGS

Referring now to the attached drawings which form a part of this original disclosure.

DETAILED DESCRIPTION OF THE PREFERRED EMBODIMENT

A selected preferred embodiment of the present invention will now be explained with reference to the drawings. It will be apparent to those skilled in the art from this disclosure that the following description of the embodiment of the present invention is provided for illustration only, and not for the purpose of limiting the invention as defined by the appended claims and their equivalents.

An embodiment of a rotational angle detector according to the present invention will be described below with reference to the accompanying drawings.

Figure 1:
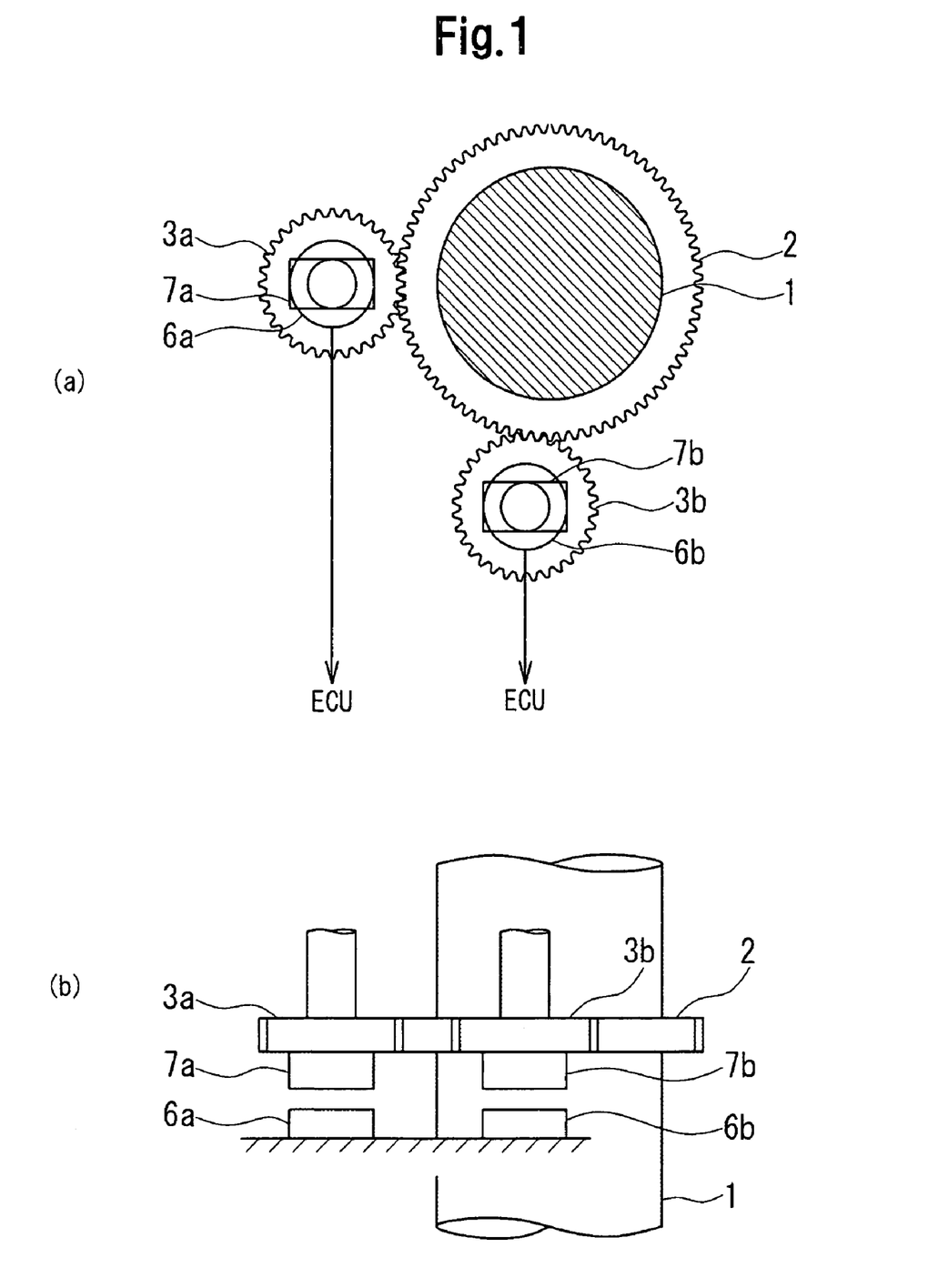
FIGS. 1A and 1B are diagrams illustrating the layout of an angle sensor unit in an embodiment of the present invention.

FIGS. 1A and 1B illustrate the layout of an angle sensor unit in the rotational angle detector. FIG. 1A shows the angle sensor unit viewed from the axis direction of a steering shaft, and FIG. 1B is a side view of FIG. 1A.

A drive gear 2 is secured to the steering shaft 1 which is a measured rotational element, and rotates in synchronization with the steering shaft 1. The drive gear 2 meshes with driven gears 3 (3a, 3b) which are identical in the number of teeth and rotate at the same angle as each other. Magnets 7 (7a, 7b) are respectively secured to the rear faces of the driven gears 3a, 3b.

Below the driven gears 3a, 3b, the magnets 7a, 7b respectively face MR (magneto resistive) sensors 6 (6a, 6b) which are attached to a fixed member of the vehicle body. The MR sensors 6a, 6b are 90° out of phase and detect the rotation of the respective driven gears 3 combined with the magnets 7 from a change in the magnetic field. Specifically, each of the MR sensors 6a, 6b non-ambiguously detects an angular position of the corresponding driven gear 3 within the range of a half turn (one period), and outputs a periodic angular position in accordance with the rotation of the driven gear 3.

In FIG. 1A, the driven gear 3, the MR sensor 6 and the magnet 7 are shown perspectively one above the other.

Figure 2:
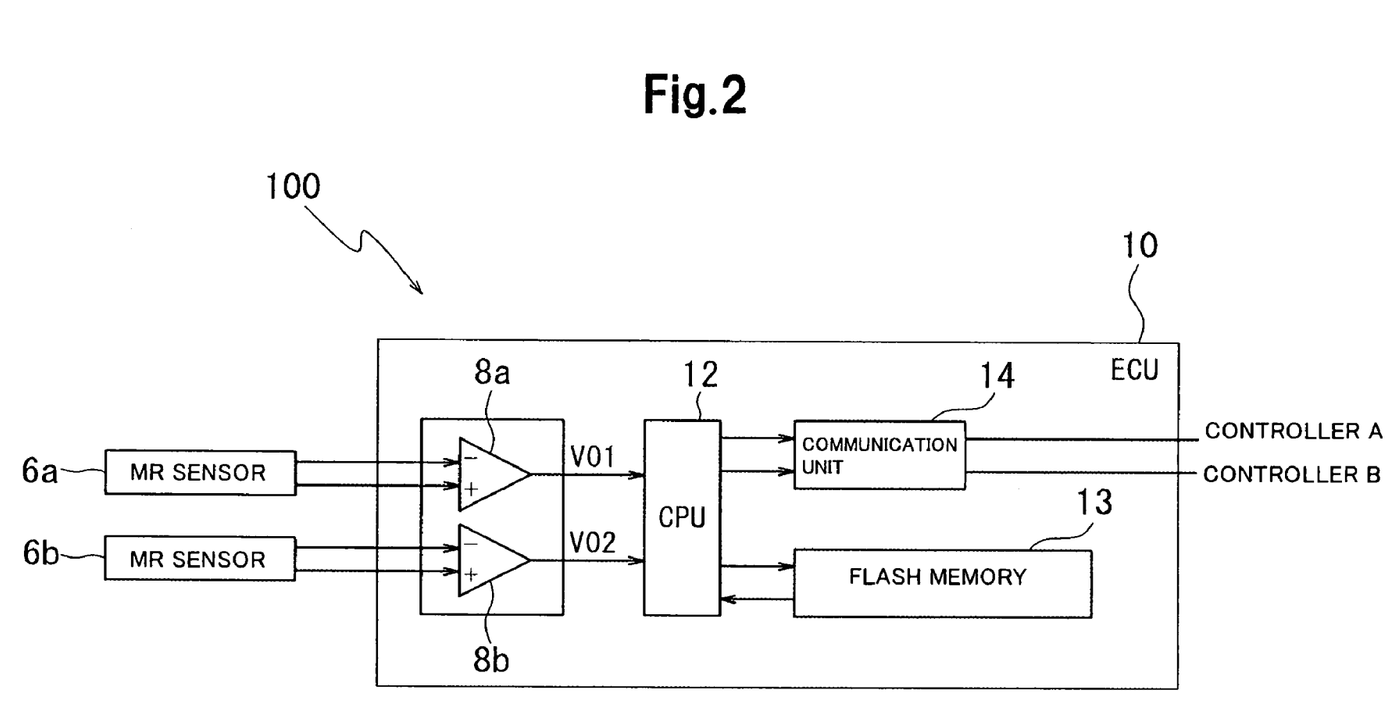
FIG. 2 is a block diagram illustrating the overall structure of a rotational angle detector.

FIG. 2 is block diagram showing the entire structure of the rotational angle detector 100.

An electronic control unit (ECU) 10 comprises a CPU 12 and amplifiers 8a, 8b. The signals outputted from the MR sensors 6a, 6b are respectively amplified by the amplifiers 8a, 8b, and then inputted to the CPU 12.

The CPU 12 is connected to a flash memory 13.

The MR sensors 6a, 6b and the ECU 10 are respectively applied with predetermined drive voltages by a power source (not shown).

The CPU 12 is connected through a communication unit 14 to a controller A requiring the absolute rotational angle such as a headlight control system for the vehicle the vehicle and a controller B requiring a relative rotational angle signal such as an Electronic Stability Control System.

The CPU 12 performs predetermined calculation processing based on the signals which are outputted from the MR sensors 6a, 6b and then amplified by the amplifiers 8a, 8b, to calculate an absolute rotational angle of the steering shaft 1, and then sends the absolute rotational angle via the communication unit 14 to the controller A for the vehicle.

Figure 3:
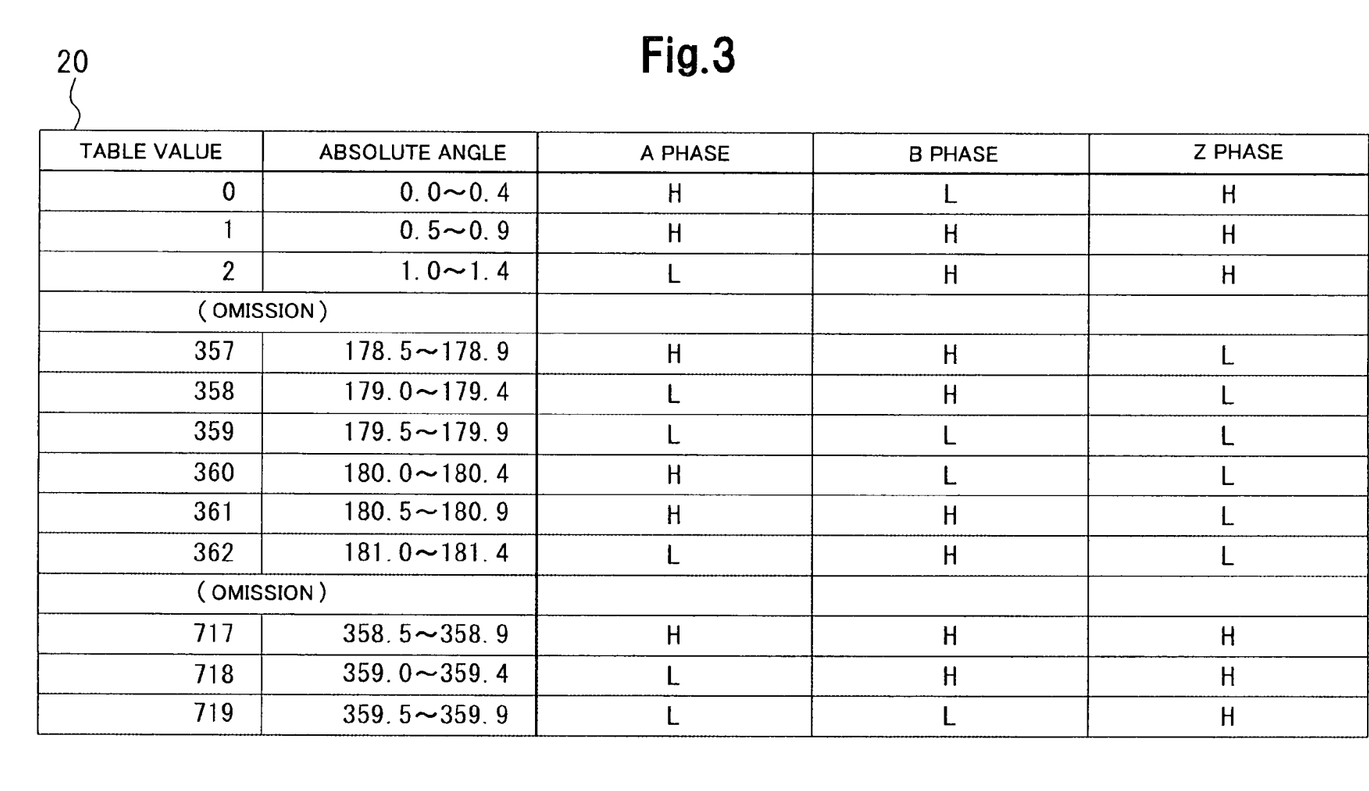
FIG. 3 is a diagram showing an example of a table used for generating a relative rotational angle signal.

The CPU 12 stores a table 20 in an internal memory (not shown). FIG. 3 shows an example of the table 20 containing table values, absolute rotational angles (absolute angles) and pulse data which are preset thereon in connection with one another.

In the table 20 in FIG. 3, an absolute angle of a turn of the steering shaft 1 by way of example is shown on a 0.5° basis. The table values from zero to 719 are set in correspondence with the absolute angles. The pulse data indicate A-phase, B-phase and Z-phase pulses each preset at "H" level or "L" level for each table value on the basis of a predetermined pulse pattern.

Specifically, each of the A-phase and B-phase pulses repeats "H" and "L" as a unit of two adjacent table values. The two repeating H and the two repeating L are staggered between the A phase and the B phase by one line of each table value. Thereby, with an increase in table value (increase in the absolute angle), the A phase and the B phase create pulse trains separated from each other by a one-quarter period.

The Z phase represents a predetermined angle range centered on the neutral position. In this embodiment, in the Z phase, "L" is set for a plurality of the table values of which the absolute angle of 180 degrees is positioned in the middle, and "H" is set for the remainder.

Figure 4:
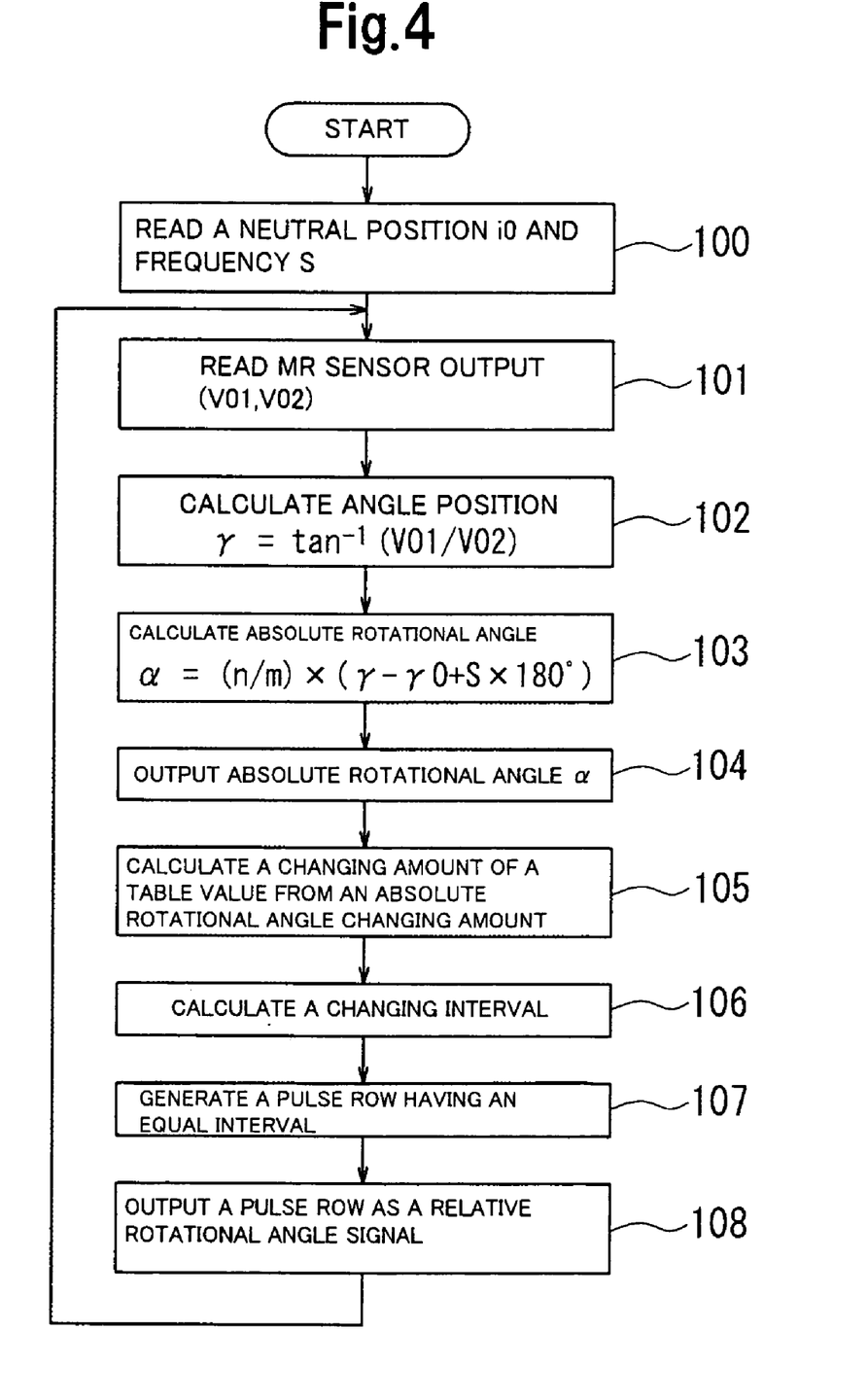
FIG. 4 is a flowchart showing the flow of calculation processing.

The operation of the rotational angle detector of the above structure will be described below. FIG. 4 is a flowchart showing the flow of calculation processing performed by the CPU 12.

At step 100, the CPU 12 retrieves values of the neutral position γ0 and the frequency S as initial values from the flash memory 13.

At step 101, the CPU 12 receives signals V01, V02 resulting from the amplification of the outputs from the MR sensors 6a, 6b by the amplifiers 8a, 8b, and then calculates an angular position γ within the period of the rotation of the MR sensor at step 102.

Figure 5:
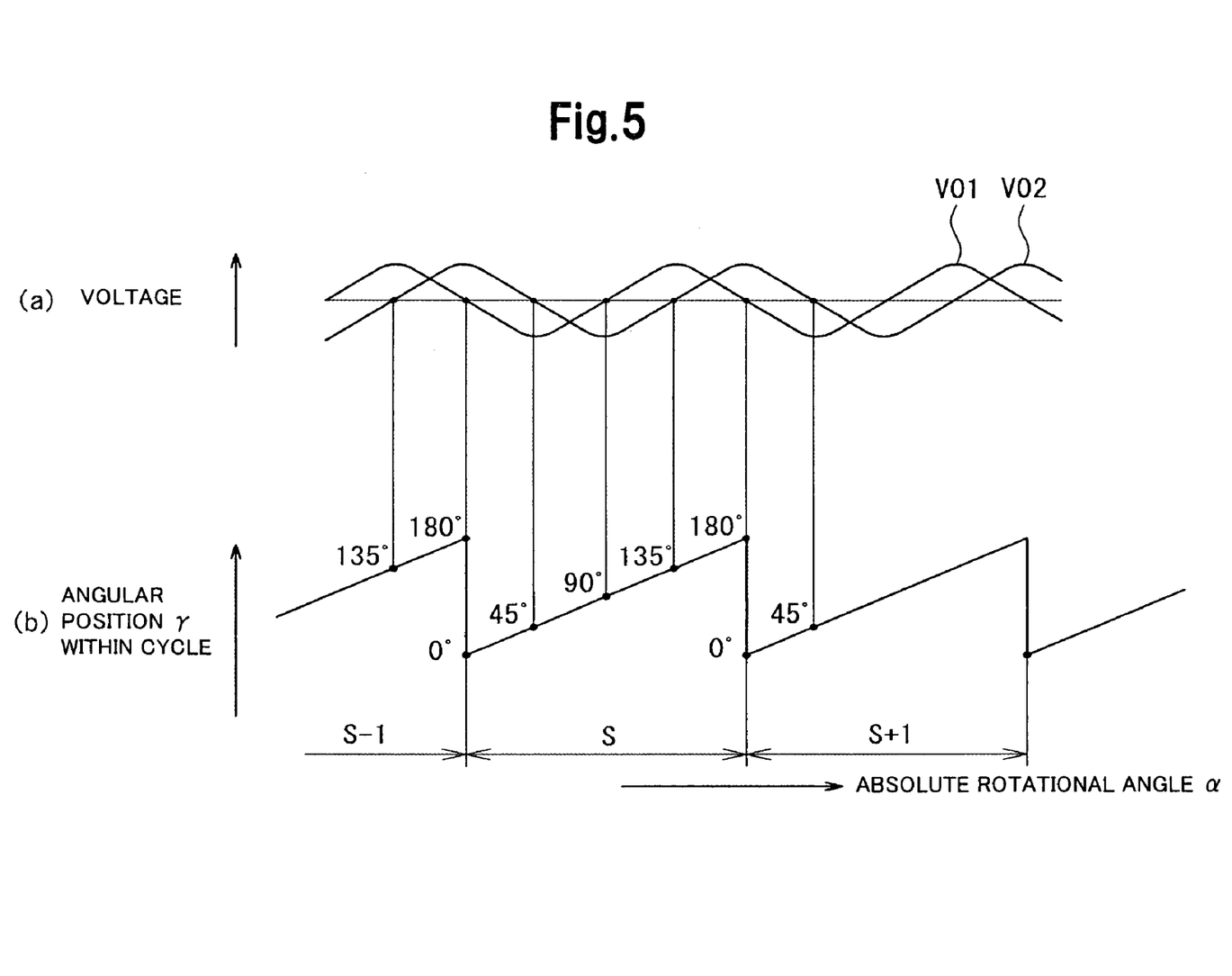
FIG. 5 is a chart showing the relationship between angular positions of a driven gear and input to an electron control unit.

As shown in Section A of FIG. 5, the signals V01, V02 are separated at 90° from each other in accordance with the rotation of the driven gears 3 and then are sent to the CPU 12. The signals V01, V02 are expressed as follows:

$$V01 = V0 \times \sin 2\gamma$$

$$V02 = V0 \times \cos 2\gamma,$$

where, V0 is an amplitude voltage.

The angular position γ can be obtained from the following equation.

$$\gamma = \tan^{-1}(V01/V02) \quad (1)$$

The frequency S in the flash memory 13 is updated every time when the angular position γ goes beyond 180°.

At step 103, an absolute rotational angle α is calculated.

Since each of the MR sensors 6a, 6b outputs a periodic angular position in accordance with the rotation of the driven gear 3 as described above, when the number of teeth of the drive gear 2 is m, the number of teeth of the driven gear 3 is n, the rotational angle of the driven gear 3 is β, and, in particular, the angular position within the period when the driven gear 3 is in an $S^{th}$ period is γ, the absolute rotational angle α of the steering shaft 1 is expressed by equation (2).

$$\alpha = (n/m) \times \beta \quad (2)$$
$$= (n/m) \times (\gamma - \gamma 0 + S \times 180°)$$

where γ is the neutral position serving as the reference of the absolute rotational angle, and corresponds to the straight ahead position. A value used as the frequency S is obtained by following the angular position γ, and updated and stored in the flash memory 13.

The relationship between the absolute rotational angle α and the angular position γ within the period is as shown in Section B of FIG. 5.

Regarding the neutral position γ0 used for the absolute rotational angle, in the process of attaching the MR sensors 6a, 6b to the respective driven gears 3a, 3b, γ and the frequency at the time when the vehicle is in a straight-ahead state are respectively initialized as γ0 and as S=0 through the communication unit 14 from the outside and are stored in the flash memory 13. The CPU 12 retrieves these values from the flash memory 13 for use.

At step 104, the absolute rotational angle α thus calculated is sent through the communication unit 14 to the controller A requiring the absolute rotational angle. The absolute rotational angle α is expressed by a numeric value (°).

Then, at step 105, the table 20 contained in the internal memory is used to calculate the range of change in the table value from the amount of change of the absolute rotational angle α in a predetermined sampling period.

Figure 6:
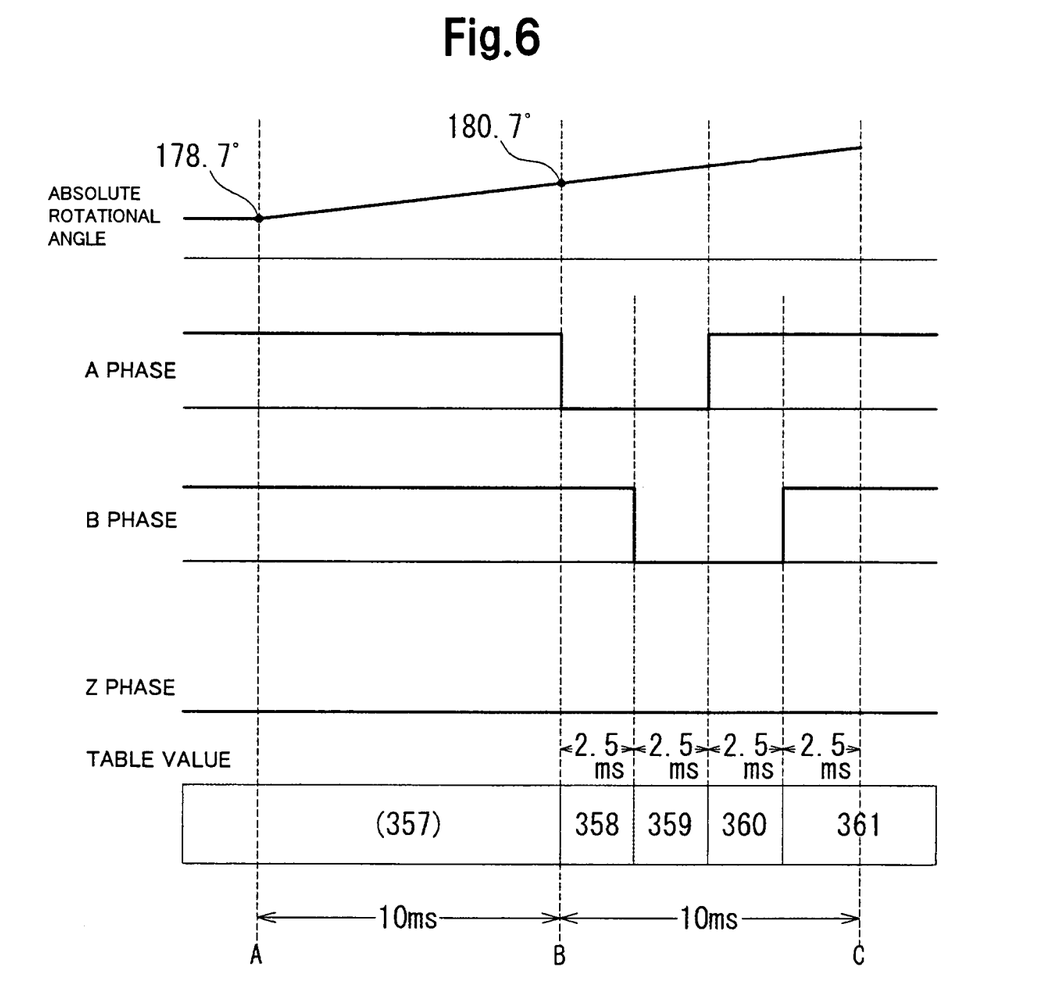
FIG. 6 is a chart showing the pulse generation based on the table.

As shown in FIG. 6, in the case of a sampling period of 10 ms (milliseconds) from A to B, if the absolute rotational angle α (absolute angle) changes from 178.7° to 180.7° in this sampling period, the table values between these angles are four values from 358 to 361. In other words, the range of change in table value is 4.

In the next step 106, an interval of transition of a pulse generated in a later stage is calculated.

In this embodiment, as expressed in equation (3), a transition interval is calculated by dividing the above-described sampling period by the range of change in table value.

$$\text{Transition interval} = 10 \text{ ms}/4 = 2.5 \text{ ms} \quad (3)$$

Then, at step 107, in the 10 ms period between B and C corresponding to a sampling period following the sampling period between A and B, a pulse corresponding to each of the table values within the range of change in table value is generated at the above-described transition interval.

Such sampling is successively performed without a break. In the above-described step 105, the amount of change of the absolute rotational angle α in the period between B and C is calculated in parallel.

Regarding the pulse generation, as shown in FIG. 6, when the table value is 358, the A phase is "L" from the table 20 in FIG. 3, the B phase is "H", and the Z phase is "L". Likewise, when the table value is 359, the A phase is "L", the B phase "L" and the Z phase "L". When the table value is 360, the A phase is "H", the B phase "L" and the Z phase "L". When the table value is 361, the A phase is "H", the B phase "H" and the Z phase "L". Each of these phases transitions in order at transition-intervals of 2.5 ms obtained in the foregoing.

As a result, the A-phase and B-phase pulses thus generated create pulse trains transitioning at equal intervals in each period corresponding to the sampling period.

At step 108, the A-phase pulse and the B-phase pulse, together with the Z-phase pulse, are sent as relative rotational angle signals through the communication unit 14 to the controller B which requires the relative rotational angle.

Then, the procedure goes back to step 101.

The foregoing steps are repeated, with the result that, along with the rotation of the steering shaft 1, the relative rotational angle signal is outputted as a pulse train showing the same pulse pattern as that of the example illustrated in FIG. 8.

For the relative rotational angle signal, the transition intervals in the pulse train are equally set in each predetermined period which is identical in length with the sampling period. This facilitates the calculation processing for an interval of pulse transition. Also, a simple process of changing the table value makes it possible to process a timer interrupt and the like, resulting in a low load on the CUP 12.

In the embodiment, the steering shaft 1 corresponds to the measured rotational element of the present invention, the absolute rotational angle to the absolute rotational angle, the relative rotational angle signal to the relative rotational-angle signal, and the driven gears 3a, 3b to the rotational member.

Also, in the CPU 12, the configuration of carrying out the processing of steps 100 to 103 in the flow chart in FIG. 4 corresponds to the absolute rotational-angle detecting unit of the present invention, the configuration of carrying out the processing of steps 105 to the rotational-angle change-amount calculating unit, the configuration of carrying out the processing of step 106 to the transition-interval setting unit, and the configuration of carrying out the processing of step 107 to the pulse generating unit.

According to the embodiment, in the rotational angle detector 100 which is structured as described above and outputs an absolute rotational angle α including the frequency of the steering shaft 1, the amount of change of the absolute rotational angle is calculated on a sampling period basis, and a transition interval is set on the basis of the sampling period and the amount of change of the absolute rotational angle. In addition, based on the pulse pattern preset in correspondence with each 0.5° region of the absolute rotational angle, pulses are generated so as to transition at the above-described transition intervals in order in accordance with the change in absolute rotational angle in the sampling period. The pulses thus generated are outputted as a relative rotational angle signal. Accordingly, the output of the absolute rotational angle and the relative rotational angle signal is made possible without a conventional large-diameter disk having a plurality of slits for output of a pulse signal indicating a relative rotational angle. In addition, the use of a small-sized angular sensor such as of MR sensor technology makes it possible to reduce in size of the entire rotational angle detector and enhance the degree of freedom of shape.

In addition, any device for outputting a relative rotational angle signal is not required to be equipped in addition to the rotational angle detector 100 outputting the absolute rotational angle. As a result, when the rotational angle detector 100 is used to generate the absolute rotational angle and the relative rotational angle signal and to send the relative rotational angle signal to, for example, an existing headlight control system and the signal indicating the absolute rotational angle to the Electronic Stability Control Systems of the vehicle. In consequence, in the case of developing a new type of vehicles equipped with both the headlight control system and the Electronic Stability Control Systems, it is possible to ensure a high degree of design freedom and to avoid a considerable increase in cost caused by providing two apparatuses.

The aforementioned pulse pattern is prepared in advance as table 20 in which the predetermined-unit regions of the absolute rotational angle (absolute angle) are respectively assigned table values and pulse data is set in correspondence with each table value. The transition interval of the output pulse is determined by dividing the sampling period by the number of table values corresponding to the amount of change of the absolute rotational angle. This facilitates the calculation processing, resulting in small load.

Since the pulse pattern includes two pulse trains of the A-phase and B-phase pulses separated in phase by one quarter period from each other, the rotation direction can be obtained from the order of change in the correlation between A phase and B phase in the outputted relative rotational angle signal as in the conventional case.

Further, since the third Z phase is included in the pulse pattern, the pulse pattern can be used to refer the neutral position in the relative rotational angle signal, and the like.

The embodiment has described the example of the application of the present invention to a rotational angle detector for the steering shaft. However, the present invention is not limited to this example and is applicable to rotational angle detection in various apparatuses required to output signals of both the relative rotational angle and the absolute rotational angle of a measured rotational element.

In the embodiment, the absolute angle (rotational angle) regions in the table 20 are divided on a 0.5° basis and assigned the table values or the sampling period is determined as 10 ms. However, these values are described for purposes of illustration and not limitation, and should be set as appropriate for purposes.

The table 20 is described as being stored in the internal memory of the CPU 12 in advance. However, the table 20, together with the neutral position γ0 and the frequency S, may be stored in an external flash memory 13 and read therefrom. This facilitates the exchange of tables which differ in pulse pattern, in particular, the neutral position in the Z phase.

While only a selected preferred embodiment has been chosen to illustrate the present invention, it will be apparent to those skilled in the art from this disclosure that various changes and modifications can be made herein without departing from the scope of the invention as defined in the appended claims. Furthermore, the foregoing description of the preferred embodiment according to the present invention is provided for illustration only, and not for the purpose of limiting the invention as defined by the appended claims and their equivalents.

What is claimed is:

1. A rotational angle detector equipped with an absolute rotational angle detecting means for detecting an absolute rotational angle including a frequency of a measured rotational element to output the absolute rotational angle, comprising:
   a rotational-angle change-amount calculating means for calculating the amount of change of the absolute rotational angle from one sampling period to another;
   a transition-interval setting means for setting a transition interval on the basis of the sampling period and the amount of change of the absolute rotational angle; and
   a pulse generating means for generating pulses transitioning in order at the transition intervals in accordance with the change of the absolute rotational angle in the sampling period on the basis of a pulse pattern present in correspondence with each predetermined-unit region of the absolute rotational angle,
   wherein the pulses thus generated are outputted as a relative rotational-angle signal.

2. The rotational angle detector according to claim 1, further comprising a table containing table values respectively assigned to the predetermined-unit regions of the absolute rotational angle, and pulse data on the pulse pattern set in correspondence with each of the table values,
   wherein the transition-interval setting unit defines as the transition interval a value obtained by dividing the sampling period by the number of table values corresponding to the amount of change of the absolute rotational angle in the table.

3. The rotational angle detector according to claim 2, wherein the pulse pattern includes pulse trains of two phase pulses separated in phase by one quarter period from each other.

4. The rotational angle detector according to claim 3, wherein the absolute rotational-angle detecting unit comprises an MR sensor provided a rotational member rotating in association with the measured rotational element for detecting a periodic angular position, and performs calculation processing on output of the MR sensor to detect the absolute rotational angle.

5. The rotational angle detector according to claim 2, wherein the absolute rotational-angle detecting unit comprises an MR sensor provided a rotational member rotating in association with the measured rotational element for detecting a periodic angular position, and performs calculation processing on output of the MR sensor to detect the absolute rotational angle.

6. The rotational angle detector according to claim 1, wherein the pulse pattern includes pulse trains of two phase pulses separated in phase by one quarter period from each other.

7. The rotational angle detector according to claim 6, wherein the absolute rotational-angle detecting unit comprises an MR sensor provided a rotational member rotating in association with the measured rotational element for detecting a periodic angular position, and performs calculation processing on output of the MR sensor to detect the absolute rotational angle.

8. The rotational angle detector according to claim 1, wherein the absolute rotational-angle detecting unit comprises an MR sensor provided a rotational member rotating in association with the measured rotational element for detecting a periodic angular position, and performs calculation processing on output of the MR sensor to detect the absolute rotational angle.

* * * * *

UNITED STATES PATENT AND TRADEMARK OFFICE
CERTIFICATE OF CORRECTION

PATENT NO. : 7,548,058 B2  Page 1 of 1
APPLICATION NO. : 11/730206
DATED : June 16, 2009
INVENTOR(S) : Toshi Katoh It is certified that error appears in the above-identified patent and that said Letters Patent is hereby corrected as shown below:

Title Page:
Item (54) and col. 1, line 1, should read:
-- ROTATIONAL ANGLE DETECTOR WITH ROTATIONAL ANGLE CHANGE-AMOUNT CALCULATING UNIT CALCULATING AMOUNT OF CHANGE OF ABSOLUTE ROTATIONAL ANGLE --.

Column 8, Line 38:
"present" should be changed to -- preset --.

Column 8, Line 48:
"the transition-interval setting unit defines as" should be deleted.

Signed and Sealed this

Fourth Day of August, 2009

JOHN DOLL
*Acting Director of the United States Patent and Trademark Office*